United States Patent

[11] 3,560,662

[72] Inventors Luigi Casella; Giorgio De Varda, Milan, Italy
[21] Appl. No. 771,770
[22] Filed Oct. 30, 1968
[45] Patented Feb. 2, 1971
[73] Assignee Societa Italiana Telecomunicazioni Siemens s.p.a. Milan, Italy
[32] Priority Oct. 30, 1967
[33] Italy
[31] 22,151A/67

[54] TIME-SHARING TELECOMMUNICATION SYSTEM WITH LOGIC CIRCUITRY FOR CLASSIFYING LINE-VOLTAGE CHANGES OF DIFFERENT DURATION
7 Claims, 9 Drawing Figs.

[52] U.S. Cl. .......... 179/18, 179/15(Sig)
[51] Int. Cl. .......... H04m 3/22
[50] Field of Search .......... 179/15Sig, 18.6A, 18.6, 18.9

[56] References Cited

UNITED STATES PATENTS 3,158,812 11/1964 Bartlett .......... 179/15(Sig)X
3,420,960 1/1969 Jacoby et al. .......... 179/18(.6A)

*Primary Examiner*—Kathleen H. Claffy
*Assistant Examiner*—Thomas W. Brown
*Attorney*—Karl F. Ross

ABSTRACT: Voltage changes of different duration (dialing pulses, interdigit pauses, release of line) on a subscriber line of a telephone system are classified by a rapidly recurring sampling pulse ($M_A$), whose cadence is a fraction of the duration of a dialing pulse, and by a more slowly recurring test pulse (Z) with a period equal to a dialing pulse cycle. A logic matrix, responding to changes in line voltage detected by the sampling pulse, generates a first group of stable output signals (R, B, B′) and unstable output signals ($B_1$, $B_2$, $B_1'$, $B_2'$) relating to one voltage state (0) and a second group of stable output signals (H, C, C′) and unstable output signals ($H_1$, $H_2$, $C_1$, $C_2$, $C_1'$, $C_2'$) relating to an alternate voltage stage (1), a sustained voltage change from one state (e.g. 1) to the other (e.g. 0) causing a switchover from an assigned stable output signal (e.g. C) of one group by way of associated unstable output signals (e.g. $C_1$, $C_2$) to a corresponding stable output signal (e.g. B) of the other group. The occurrence of a test pulse (Z) shifts the output signals within each group in a predetermined sequence from a starting signal (B or C) via a transition signal (B′ or C′) to a permanence signal (R or H), giving rise to either of two classification pulses ($M_L$, $M_F$) to indicate line release in the presence of a permanence signal of the first group (R) or an interdigit pause in the presence of a transition signal of the second group (C′). A switchover to a starting signal of the second group (C) gives rise to a further classification pulse ($M_C$) to indicate a dialing pulse.

INVENTORS:
Luigi Casella
Giorgio De Varda
BY
Karl F. Ross
Attorney

INVENTORS:
Luigi Casella
Giorgio De Varda

BY

Karl F. Ross
Attorney

Luigi Casella
Giorgio De Varda
INVENTORS.

BY

Karl F. Ross
Attorney

INVENTORS:
Luigi Casella
Giorgio De Varda
BY
Karl G. Ross
Attorney

Luigi Casella
Giorgio De Varda
INVENTORS.

BY

Karl G. Ross
Attorney

TIME-SHARING TELECOMMUNICATION SYSTEM WITH LOGIC CIRCUITRY FOR CLASSIFYING LINE-VOLTAGE CHANGES OF DIFFERENT DURATION

Our present invention relates to a telecommunication system with one or more channels, such as telephone subscriber lines, each having two significant states of energization which are subject to changeover in relatively short pulsing cycles and in relatively long switching intervals.

In conventional telephone exchanges, a subscriber initiates a call by lifting his receiver off the hook to close the line circuit, thereby generating a state of energization which may be represented by the digit 1 (in contradistinction to the open-circuit state denoted by the digit 0) and which informs the central office that the line has been seized. After the subscriber is informed by a dial tone that the connection has been extended to a selector switch by the usual line finder, dialing pulses generated by the subscriber interrupt the line loop for short periods on the order of 0.1 second. Between trains of such dialing pulses, representing respective digits of the selected number, pauses upward of several tenths of a second occur, the line remaining closed during these variable intervals; a similar condition exists after dialing has been terminated. When the subscriber hangs up, the line remains open for an extended period, indicating its release.

In time-sharing systems wherein a plurality of conversations are concurrently transmitted over a common trunk line, the several subscriber lines are periodically scanned in cyclic succession during an interval representing a small fraction of the duration of a dialing pulse, generally on the order of 100 microseconds. Although the scanning or gating pulses will reveal whether any line is open or closed at the moment, they do not furnish any direct information as to the nature of any detected change in line voltage, i.e. whether the same is due to a dialing pulse, an interdigit pause or a release of the line. In high-speed central office equipment, however, in which switching operations are carried out virtually instantaneously with the aid of logic circuits, such information is necessary for a proper routing of the received signals.

In commonly owned application Ser. No. 676,135, filed Oct. 18, 1967 by Giorgio De Varda and Saverio Martinelli, there has been disclosed a system for discriminating between dialing pulses and other voltage changes on a subscriber line with the aid of a clock circuit at the central office, the clock circuit measuring the length of an input pulse and being controlled by a phase or pulse cycle of a dynamic memory which currently stores and continuously recycles, during a scanning interval, coded information relating to a multiplicity of associated subscriber lines. A dynamic memory of this type, using four delay lines for the continuous recycling of four-bit binary words, has also been disclosed in commonly owned application Ser. No. 735,606 filed June 10, 1968 by Giorgio De Varda, Saverio Martinelli and Aldo Perna.

The general object of our present invention is to provide, in a telecommunication system of the general character set forth, means for converting brief voltage samples from a subscriber line or other communication channel into classification signals without the need for a special clock circuit and without actual measurement of the duration of a voltage change to be classified.

A more particular object is to provide means for generating special classification signals positively discriminating between dialing pulses, interdigit or post dialing pauses and line release.

It is also an object of this invention to provide means for minimizing the effect of transients upon the classification of the signals.

In accordance with the present invention, we provide a source of sampling pulses with a recurrence period substantially shorter than a cycle of dialing or other rapidly recurring pulses transmitted over a communication channel to be surveyed, in combination with a source of test pulses having a recurrence period at least equal to such a pulsing cycle; in a multichannel time-sharing system, each sampling pulse (as well as advantageously, each test pulse) has a duration equal to a scanning cycle (e.g. 100 ms.) so that its coincidence with a succession of gating pulses successively detects the state of energization of the several channels to which these gating pulses are individually applied. A resulting control pulse, fed into a network individually associated with a particular channel, can be of either of two types in order to indicate the state of energization of that channel, i.e. state 0 (open circuit) or state 1 (closed circuit). This control pulse selectively energizes an output terminal forming part of either a first or a second group of outputs respectively assigned to the state 0 or the state 1. If the state of energization of the associated line does not significantly change until the next test pulse occurs, this test pulse causes a switchover between different outputs of the same group so that a signal of a particular output of the first group indicates a prolonged open-circuit condition whereas a signal of a particular output of a second group indicates a prolonged closed-circuit condition. An evaluating circuit, connected to certain of these outputs, can therefore deliver a variety of classification signals such as a line release signal (prolonged open-circuit condition), an interdigit pulse signal (extended closed-circuit condition) and a dialing pulse signal (instantaneous changeover to closed circuit).

According to a more particular feature of our invention, we provide the discriminating network with three distinct outputs in each group, i.e. a first output for a starting signal occurring upon changeover from the other group, a second output for a transition signal into which the starting signal is converted by the next test pulse if no significant change in line voltage has taken place, and a third output for a permanence signal which, under like circumstances, replaces the transition signal upon the occurrence of a further test pulse. The line release signal may then be derived from the third output of the first group (permanence signal for state 0) whereas the interdigit pause signal results from energization of the second output of the second group (transition signal for state 1); the dialing pulse signal may be generated in the presence of an output signal of the first group and in response to a control pulse of the second type, i.e. a pulse giving rise to a starting signal on the first output of the second group.

According to a further feature of our invention, some or all of the outputs of either or both groups are subdivided into several terminals to develop a stable form and one or more unstable forms of the corresponding signal, the stable form of the starting signal occurring upon changeover from the other group but degenerating into an unstable form if the next sampling pulse reveals a change in the state of energization of the associated line. Since such a change may be due to spurious transients, the stable form of the signal is restored if a further sampling pulse detects a return to the previous state of energization and generates a "reinforcing" control pulse; conversely, if the change in line voltage is confirmed by this further sampling pulse, the changeover to the other group of outputs takes place in response to an "opposed" control pulse. In as similar manner, if a test pulse has switched the signal to the second output of the group, the resulting transition signal appears in a stable or in an unstable form, depending on whether the switchover within the group occurs from the stable or the unstable form of the starting signal; also, if a control pulse of "opposed" type appears in the presence of a stable form of transition signal on the second output of a group, this transition signal degenerates to its unstable form, followed by a changeover to the other group or a reversion to the stable form according to the opposed or aiding nature of the next control pulse. In actual practice, and as more fully disclosed hereinafter with reference to a preferred embodiment, there may be at least two unstable forms of each starting and transition signal as well as of the permanence signal of the second group, thereby further reducing the influence of spurious voltage charges.

The principle of eliminating transients by requiring a succession of control pulses of like character for a changeover has already been broadly disclosed in the aforementioned copending application Ser. No. 676,135 and is therefore claimed by us only in combination with a classification system of the type set forth above.

The invention will be described in greater detail with reference to the accompanying drawing in which.

Figures 1, 2, 3:
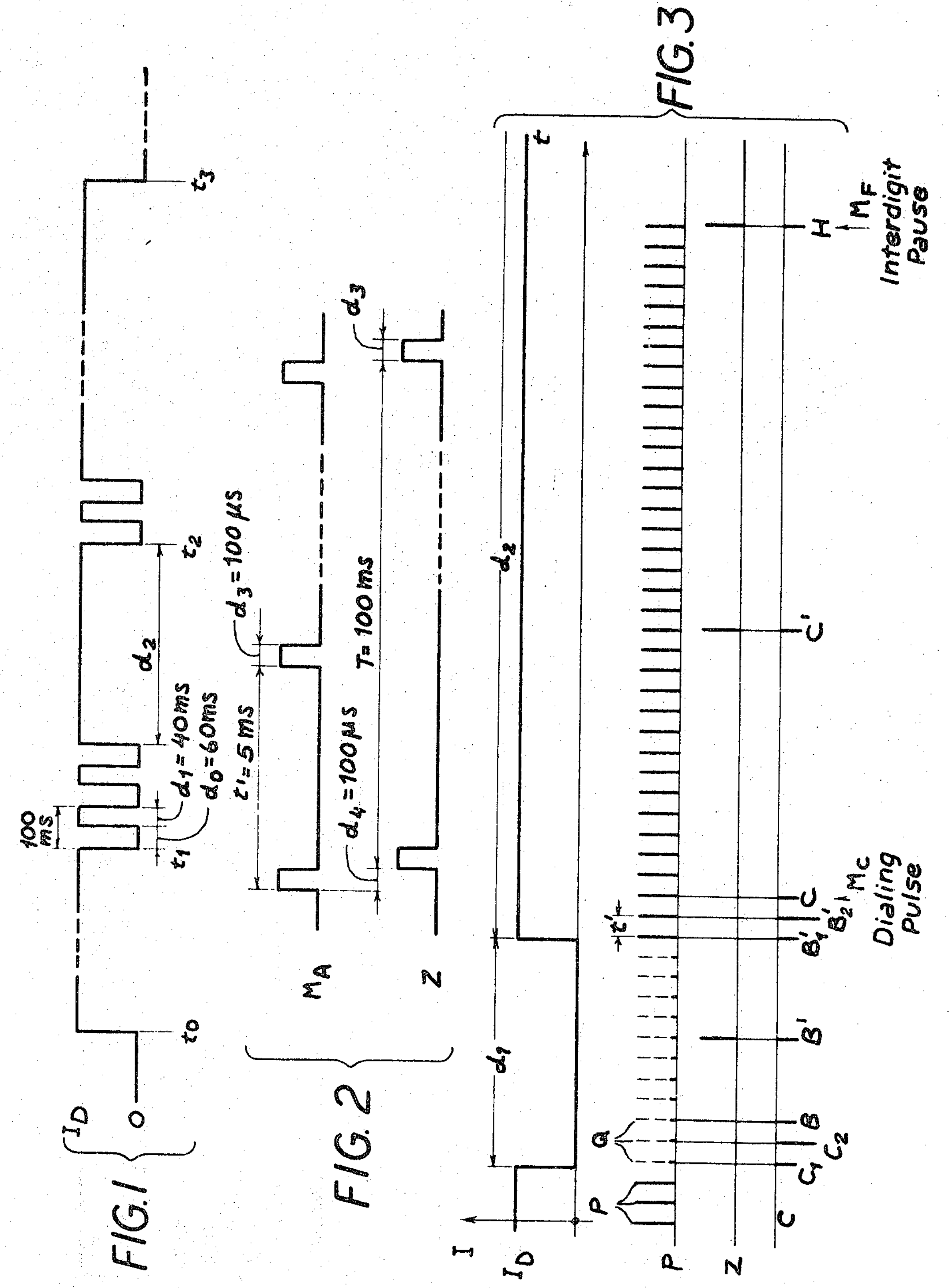
FIG. 1 is a graph showing a train of dialing pulses transmitted over a telephone subscriber line.
FIG. 2 is a set of graphs showing the timing of associated sampling and test pulses.
FIGS. 3 and 4 are further sets of graphs illustrating the generation of various classification signals.

In FIG. 1 we have shown the state of energization of a subscriber line of a conventional telephone system during transmission of dialing pulses, the line current (and therefore the line voltage) varying between zero and a value $I_D$ (state 1) which in this idealized case is assumed to be constant. Current $I_D$ begins to flow at a time $t_0$ when the subscriber lifts his receiver off the hook. At a subsequent instant $t_1$, the current is interrupted for a brief period $d_0$ here taken as 60 ms.; current flow then resumes for a period $d_1 = 40$ ms. so that the overall pulsing cycle has a duration of 100 ms. A train of such dialing pulses is followed by an interval $d_2$ of variable duration which, however, is generally equal to at least one-half second and therefore encompasses several dialing pulse cycles. At a time $t_2$, the subscriber dials another digit, thus ending the interval $d_2$; at a further time $t_3$ he restores his receiver and finally breaks the connection.

The subscriber line diagrammatically represented in FIG. 1 is assumed to be one of a multiplicity of such lines which are periodically scanned, in cyclic succession, by a corresponding number of gating pulses from a conventional pulse distributor not shown whose operating cycle is a small fraction of period $d_0 + d_1$, specifically 100 ms. in the case here considered. Thus, a dialing pulse is repeatedly detected during successive scans of the subscriber line referred to.

In FIG. 2, we have shown a succession of sampling pulses $M_A$ whose duration $d_3$ equals the aforedescribed scanning cycle of 100 ms. so that its sampling pulse successively coincides with all the gating pulses used to unblock the associated subscriber lines. The cadence of these sampling pulses is a multiple of that of the dialing pulses of FIG. 1, their recurrence period $t'$ being therefore a fraction of a dialing pulse cycle. In the specific example here given, the period $t' = 5$ ms. so that 12 sampling pulses $M_A$ occur during each open-circuit interval $d_0$. As further shown in FIG. 2, a succession of test pulses Z, with the same duration $d_3$ but with a recurrence period T equal to a dialing pulse cycle (100 ms.), are generated in staggered relationship with the pulses $M_A$, the offset $d_4$ between these two pulses trains being here shown equal to the pulse duration $d_3$.

FIG. 3 shows in its upper graph the line current I varying again between two levels 0 and $I_D$ over an indefinite time $t$. The second graph represents a succession of control pulses P and Q whose period $t'$ equals that of sampling pulsed $M_A$ (FIG. 2) and which are derived from these sampling pulses in accordance with the state of energization of the associated subscriber line as determined by the concurrently applied gating pulses. Pulses P denote the flow of line current $I_D$ (state of energization 1) whereas pulses Q occur in the absence of current flow (state of energization 0). Also shown in FIG. 3 are the periodically recurring pulses Z as well as various signals described in greater detail hereinafter.

Figure 4:
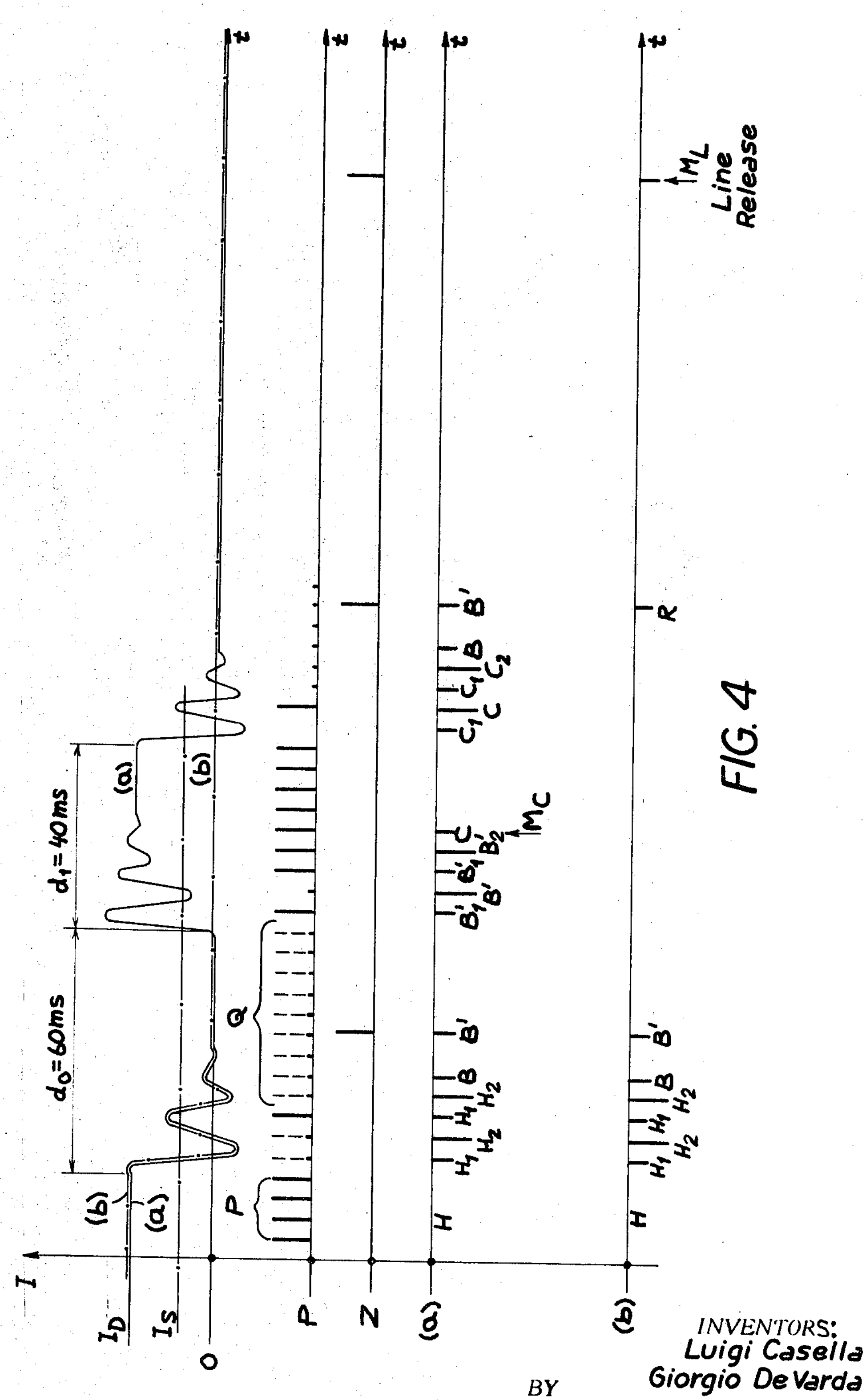

FIG. 4 shows in its first graph a less idealized version of FIG. 1, two different current shapes ($a$) and ($b$) having been illustrated in full lines and dot-dash lines, respectively. The waveforms of this graph include positive and negative peaks, due to transients, which pass beyond a threshold level $I_s$ separating the two states 0 and 1. Also shown in FIG. 4 are the aforedescribed pulse trains P, Q and Z as well as two sets of signals, more fully described hereinafter, relating to the current shapes ($a$) and ($b$).

Figures 5, 8, 9:
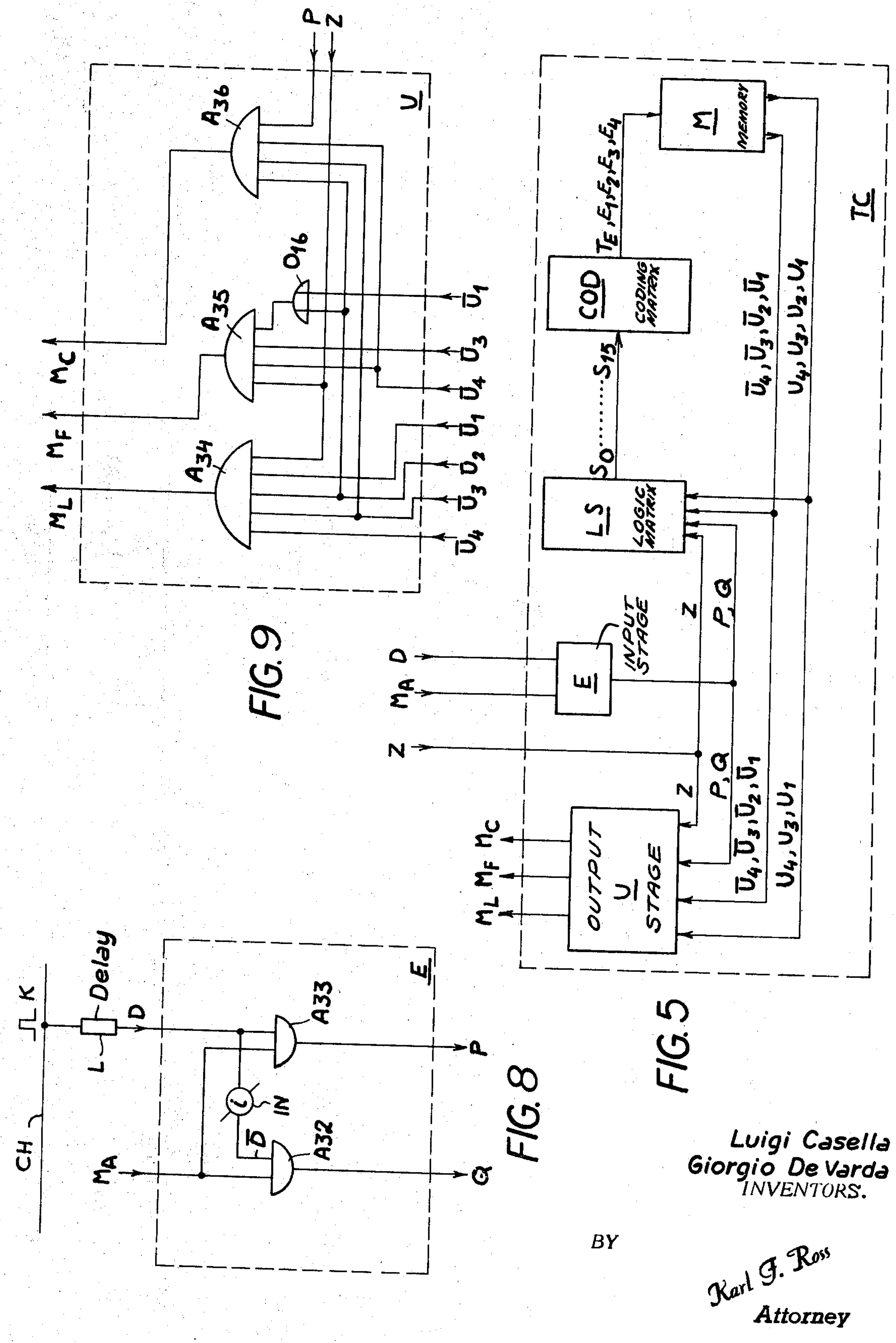
FIG. 5 is a block diagram of a classification network according to the invention.
FIG. 8 is a circuit diagram of an input stage of the network of FIG. 5.
FIG. 9 is a circuit diagram of an output stage of the same network.

FIG. 5 shows a discriminating network TC comprising an input stage E, a logic matrix LS, a coding matrix COD, a dynamic memory M of the circulating type as described in the above identified copending applications, and an output stage U. Input stage E receives the sampling pulses $M_A$ as well as a train of pulses D which represents a delayed and broadened replica of the voltage found present on the associated subscriber line (e.g. that of FIG. 1) during the momentary unblocking of the line by the gating pulses periodically applied thereto. Stage E derives from these two pulse trains the pulses P, Q of FIGS. 3 and 4, a pulse P coming into existence whenever a pulse $M_A$ coincides with a finite value of D whereas a pulse Q ensues whenever the sampled value of D is zero. Pulses Z, P, Q are fed to respective inputs of matrix LS whose 16 parallel outputs $S_0$ to $S_15$ have, for the sake of simplicity, been represented by a single line. The coder COD converts the signals of these outputs into a combination of bits $E_1$, $E_2$, $E_3$, $E_4$ which, together with a command pulse $T_E$, are delivered to the input of memory M for continuous recirculation, this memory comprising four parallel delay lines whose delay time is equal to a scanning interval (100 ms.) and which carry as many bits $E_1$, $E_2$, $E_3$ and $E_4$, respectively, as there are subscriber lines to be served by the memory. With 20 such subscribers, for example, each delay line of the memory encompasses 20 time slots or phases which are loaded with the corresponding bits, the output of the memory at any instant corresponding to a four-bit word representing the state of energization of a respective subscriber line. As long as this state remains unchanged, the word is fed back intact to the memory input; yet upon the occurrence of a change, the word is correspondingly altered.

FIG. 8 shows details of the input stage E of network TC. A conductor CH, representing a signaling wire of the subscriber line associated with matrix LS, is briefly unblocked by a gating pulse during a scanning cycle to produce a pulse K if the line loop is closed, i.e. if the conductor is energized, this pulse having a duration on the order of microseconds. A delay network L produces a broadened pulse D timed to coincide with the sampling pulse $M_A$, the two pulses being applied to respective inputs of an AND gate $A_{33}$ giving rise to a control pulse P. An inverter IN derives from pulse D its complement $\overline{D}$ which, together with pulse $M_A$, is fed to another AND gate $A_{32}$ generating a control pulse Q.

From the four delay lines of memory M we derive four pairs of bits $U_1$, $\overline{U}_1$; $U_2$, $\overline{U}_2$; $U_3$, $\overline{U}_3$; and $U_4$, $\overline{U}_4$. These bits are delivered to respective inputs of matrix LS and also, with the exception of bit $U_2$, to certain input leads of output stage U which also has other such leads receiving the pulses Z and P. Three output leads of stage U, when energized, carry respective classification signals $M_L$ (release of line), $M_F$ (interdigit or post dialing pause) and $M_C$ (dialing pulse); signals $M_C$ and $M_F$ are also shown in the bottom graph of FIG. 3 whereas signals $M_C$ and $M_L$ will be found in the two lower graphs ($a$) ($b$) respectively, of FIG. 4.

Figure 6:
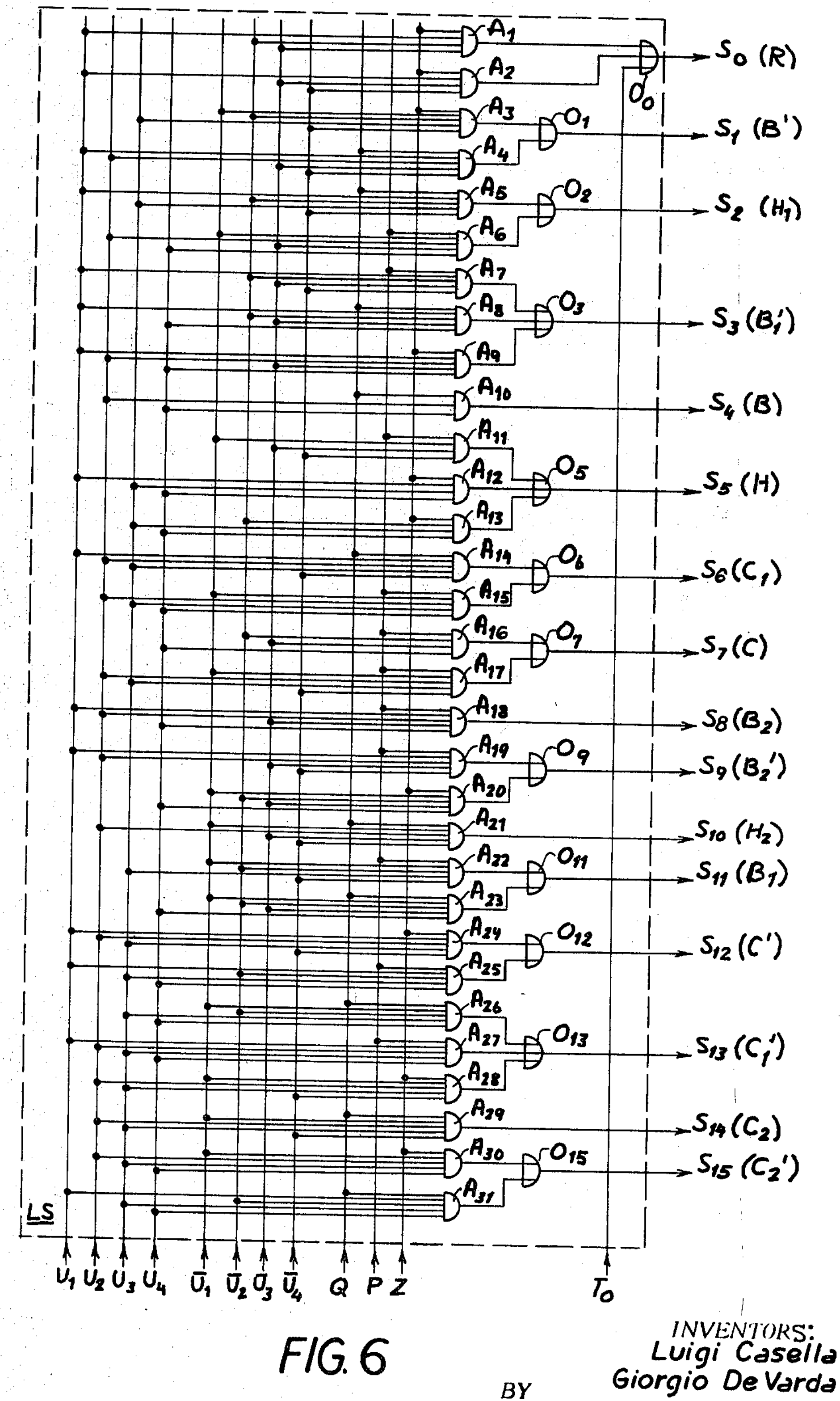
FIG. 6 is a diagram of a logic matrix forming part of the network of FIG. 5.

Logic matrix LS has been illustrated in greater detail in FIG. 6. This diagram shows the eleven inputs $U_1$ —$U_4$, $\overline{U}_1$ —$\overline{U}_4$, P, Q and Z of that matrix, its 16 outputs $S_0$ $S_{15}$, a multiplicity of AND gates $A_1$—$A_{31}$, a plurality of OR gates $O_0$—$O_{15}$, and a further input lead for a reset signal $T_0$.

The outputs of matrix LS are divided into two groups, i.e. a first group with terminals $S_0$, $S_1$, $S_3$, $S_4$, $S_8$, $S_9$, $S_{11}$ and a second group of terminals $S_2$, $S_5$, $S_6$, $S_7$, $S_{12}$, $S_{13}$, $S_{14}$, $S_{15}$. The first group, in turn, may be subdivided into a set of terminals $S_4$, $S_8$, $S_{11}$ representing a first output, a set of terminals $S_1$ $S_3$, $S_9$ representing a second output, and a single terminal $S_0$ representing a third output. The second group may be similarly subdivided into a set of terminals $S_6$, $S_7$, $S_{14}$ representing a first output, a set of terminals $S_{12}$, $S_{13}$, $S_{15}$ representing a second output, and a set of terminals $S_2$, $S_5$, $S_{10}$ representing a third output.

Terminals $S_4$, $S_{11}$ and $S_8$ carry, when energized, respective output signals B, $B_1$, $B_2$ constituting a stable form and two unstable forms of a starting signal relating to the idle or open-circuit state of the subscriber line served by this matrix. Terminals $S_1$, $S_3$ and $S_9$ respectively carry a stable from B′ and two unstable forms $B_1'$, $B_2'$ of a transition signal relating to that idle state. Terminal $S_0$ is assigned to a permanence signal R for the same state. Terminals $S_7$, $S_6$ and $S_{14}$ deliver a stable form C and two unstable forms $C_1$, $C_2$ of a starting signal relating to the busy or closed-circuit state of the line. Terminals $S_{12}$, $S_{13}$ and $S_{15}$ provide a stable form C′ and two unstable forms $C_1'$, $C_2'$ of a corresponding transition signal. Terminals $S_5$, $S_2$ and $S_{10}$ develop a stable form H and two unstable forms $H_1$, $H_2$ of a permanence signal for the busy state.

Figure 7:
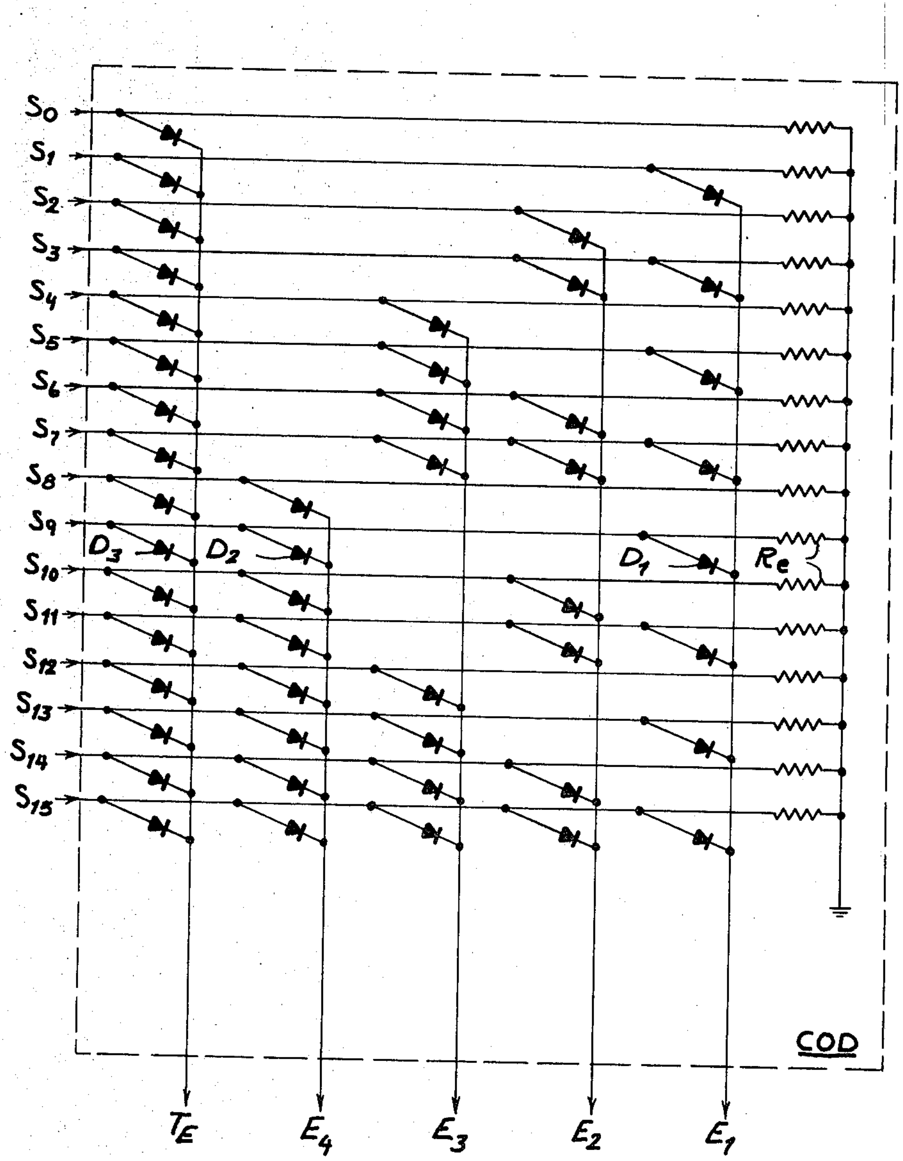
FIG. 7 is a diagram of a diode matrix, also included in the network of FIG. 5, for converting different output signals into binary words.

Output signals R, B′, $H_1$, $B_1'$, B, H, $C_1$, C, $B_2$, $B_2'$, $H_2$, $B_1$, C′, $C_1'$, $C_2$ and $C_2'$, appearing on terminals $S_0$ to $S_{15}$, respectively, are represented in the output of coding matrix COD by binary words (composed of the four bits $E_1$, $E_2$, $E_3$, $E_4$) whose numerical values correspond to the subscripts of their terminals, i.e. 0 for signal R, 1 for signal B′, 2 for signal $H_1$ and so on. FIG. 7 illustrates the internal circuits of this coding matrix which include individual resistors $R_e$ between input leads $S_0$—$S_{15}$ and ground as well as various combinations of diodes inserted between these input leads and output leads $E_1$, $E_2$, $E_3$, $E_4$, $T_E$. Lead $S_9$, for example, is connected via diodes $D_1$ and $D_2$ to leads $E_1$ and $E_4$, respectively, a further diode $D_3$ connecting it to lead $T_E$ which is connected through similar diodes to all other input leads. With lead $S_9$ driven positive to generate the signal $B_2'$ assigned to it, leads $E_1$ and $E_4$ are energized to form the combination 1001 which is the binary equivalent of "-nine." A command signal concurrently produced on lead $T_E$ conditions the memory M (FIG. 5) to store the "word" 1001 in the time slot assigned to the matrix LS, and to the associated subscriber line, if the word previously registered in that slot was different. For further details as to the operation of the coder and the memory M, reference may be made to the aforementioned U.S. application Ser. No. 735,606 and to the corresponding Italian application 17,009 A/67; for an understanding of the present invention it will be sufficient to consider the memory M as a delay loop in which the binary equivalent of the output of matrix LS is continuously recirculated, unless modified, with a period equal to the pulse duration $d_3$ *of FIG. 2*.

After a delay time equal to a scanning interval (100 ms.), the word thus stored or recirculated appears in the output of memory M as a voltage on four of the eight leads marked $U_1$—$U_4$ and $\overline{U}_1$—$\overline{U}_4$, specifically (in the case of signal $B_2'$) leads $U_1$, $\overline{U}_2$, $\overline{U}_3$, $U_4$. This voltage combination is now repeatedly fed back to the input of matrix LS until the simultaneous energization of lead Q unblocks the AND gate $A_8$ and, via OR gate $0_3$, applies voltage to lead $S_3$ to generate the signal $B_1'$ in its stead; if lead P is energized in lieu of lead Q, gate $A_{16}$ conducts together with gate $0_7$ to generate the signal C on lead $S_7$. The logical relationship between the input and output signals of matrix LS is given by the following Table, having regard to the fact that $M_A D = P$ and $M_A \overline{D} = Q$ in view of the aforedescribed mode of operation of input circuit E (FIG. 8):

$$R=(B'+B_1'+B_2')Z+T_0=\overline{U}_3\overline{U}_2U_1Z+\overline{U}_4\overline{U}_3U_1Z+T_0 \quad (1)$$
$$H=(R+H_1)M_AD+(C'+C_1'+C_2')Z=\overline{U}_4\overline{U}_3\overline{U}_1P+U_4U_3U_1Z+U_4U_3\overline{U}_2Z \quad (2)$$
$$H_1=HM_A\overline{D}+H_2M_AD=\overline{U}_4U_3\overline{U}_2U_1Q+U_4\overline{U}_3U_2\overline{U}_1P \quad (3)$$
$$H_2=H_1M_A\overline{D}=\overline{U}_4\overline{U}_3U_2\overline{U}_1Q \quad (4)$$
$$B=(H_2+B_1+C_2+C_2')M_A\overline{D}=U_4U_2Q \quad (5)$$
$$B_1=BM_AD+B_2M_A\overline{D}=\overline{U}_4U_3\overline{U}_2\overline{U}_1P+U_4\overline{U}_3\overline{U}_2\overline{U}_1Q \quad (6)$$
$$B_2=B_1M_AD=U_4\overline{U}_3U_2U_1P \quad (7)$$
$$C=(C_1+B_2+B_2')M_AD=U_4\overline{U}_3\overline{U}_2P+\overline{U}_4U_3U_2\overline{U}_1P \quad (8)$$
$$C_1=CM_A\overline{D}+C_2M_AD=\overline{U}_4U_3U_2U_1Q+U_4U_3U_2\overline{U}_1P \quad (9)$$
$$C_2=C_1M_A\overline{D}=\overline{U}_4U_3U_2\overline{U}_1Q \quad (10)$$
$$B'=BZ+B_1'M_A\overline{D}=\overline{U}_4U_3\overline{U}_2\overline{U}_1Z+\overline{U}_4\overline{U}_3U_2U_1Q \quad (11)$$
$$B_1'=B_1Z+B'M_AD+B_2'M_A\overline{D}=U_4\overline{U}_3U_2U_1Z+\overline{U}_4\overline{U}_3\overline{U}_2U_1P+U_4\overline{U}_3\overline{U}_2U_1Q \quad (12)$$
$$B_2'=B_2Z+B_1'M_AD=U_4\overline{U}_3\overline{U}_2U_1Z+\overline{U}_4\overline{U}_3U_2U_1P \quad (13)$$
$$C'=CZ+C_1'M_AD=\overline{U}_4U_3U_2U_1Z+U_4U_3\overline{U}_2U_1P \quad (14)$$
$$C_1'=C_1Z+C'M_A\overline{D}+C_2'M_AD=\overline{U}_4U_3U_2\overline{U}_1Z+U_4\overline{U}_3\overline{U}_2\overline{U}_1Q+U_4U_3U_2U_1P \quad (15)$$
$$C_2'=C_2Z+C_1'M_A\overline{D}=U_4U_3U_2\overline{U}_1Z+U_4U_3\overline{U}_2U_1Q \quad (16)$$

Signal $T_0$ is generated, in a manner not relevant to the present disclosure, in another part of the system to reset the corresponding time slot or phase of memory M to zero whenever the subscriber line is idle. This signal, applied directly to lead $S_0$ via OR gate $0_0$, may be produced in response to the line release signal $M_L$ (FIGS. 4, 5, 9) described in grater detail hereinafter. Units E, LS, COD, U (FIG. 5) are individual to the subscriber line considered whereas memory M is common to all lines included in the same time-sharing system.

From the foregoing table it will be noted that coincidence of a test pulse Z with the stable form B or either of the unstable forms $B_1$, $B_2$ of the starting signal of the first group outputs gives rise to the corresponding form B′, $B_1'$ or $B_2'$ of the related transition signal as expressed in equations (11) (12) and (13); that, similarly, coincidence of such a test pulse with the stable form C or either of the unstable forms $C_1$, $C_2$ of the starting signal of the second group of outputs gives rise to the corresponding form C′, $C_1'$ or $C_2'$ of the related transition signal as expressed in equations (14), (15) and (16); that, furthermore, the simultaneous occurence of a pulse Z with any form of transition signal B′, $B_1'$ or $B_2'$ of the first group of outputs generates the permanence signal R, as per equation (1); and that, finally, a pulse Z occurring jointly with any form of transition signal C′, $C_1'$ or $C_2'$ of the second group of outputs produces the permanence signal of the latter group in its stable form H, equation (2). Also, an "opposed" control pulse P coinciding with a stable form B or B′ of a starting or transition signal in the first group of outputs creates the first unstable form $B_1$ or $B_1'$ thereof, respectively, as indicated by equations (6) and (12), whereas a "reinforcing" or "aiding" control pulse Q has the same effect with reference to the stable forms C, C′ and the unstable forms $C_1$, $C_1'$ of the analogous signals in the second group of outputs, see equations (9) and (15). Similarly, coincidence of a pulse P with the first unstable form $B_1$ $B_1'$ in the first group generates the corresponding second unstable form $B_2$ or $B_2'$, note equations (7) and (13), and analogous conversion from form $C_1$ or $C_1'$ to form $C_2$ or $C_2'$ being performed by a control pulse Q in the second group as set forth in equations (10) and (16). If the same "opposed" control pulse P coacts with the second unstable signal form $B_2$ or $B_2'$ of the first group, it invariably produces the stable form C of the starting pulse of the second group, equation (8), whereas the analogous signal forms $C_2$ and $C_2'$ of the second group are invariably converted into the stable starting pulse B of the first group by the "opposed" control pulse Q, equation (5). On the other hand, the concurrence of an "aiding" pulse Q with the first unstable signal form $B_1$ or $B_1'$ of the first group restores the corresponding stable form B or B′, in accordance with equations (5) and (11), whereas its concurrence with the second unstable form $B_2$ or $B_2'$ of that group converts same to the first unstable form $B_1$ or $B_1'$, see equations (6) and (12). By the same token the coincidence of an "aiding" pulse P with the unstable signal form $C_1$ or $C_1'$ of the second group restores the stable form C or C′, equations (8) and (14), whereas its coincidence with the unstable signal form $C_2$ or $C_2'$ reestablishes the form $C_1$ or $C_1'$, as per equations (9) and (15).

FIG. 3 shows how a succession of control pulses P, generated upon detection of a temporary closed-circuit condition during dialing, establishes an output signal C which, in response to the first three control pulses Q occurring during the following open-circuit interval, degenerates into the unstable signals $C_1$ and $C_2$ and changes into the stable starting signal B of the other group. With the occurrence of the next test pulse Z, the latter signal changes to the corresponding transition signal B′ which, upon reclosure of the line loop, is successively converted into the unstable forms $B_1'$ and $B_2'$ before changing back into signal C in response to the first three pulses P of the next train. Another test pulse Z replaces the starting signal C by the corresponding transition signal C′. A further pulse Z transforms the latter into the permanence signal H indicating persistence of the closed-circuit condition.

The changeover to signal C in response to the third control pulse P coincides with the generation of a classification signal $M_C$ to indicate the completion of a dialing pulse, Since, according to equation (8), such a changeover may occur either from signal $B_2$ (numerical value "eight") or from signal $B_2'$ (numerical value "nine") as expressed by the logical product $U_4 \bar{U}_3$ U2P, the pulses $\bar{U}_2$, $\bar{U}_3$, $U_4$ and P are applied to respective inputs of an AND gate $A_{36}$ in stage U, FIG. 9, to create the signal $M_C$ simultaneously with the energization of output terminal $S_7$ of matrix LS (FIG. 6) via AND gate $A_{16}$ and OR gate $0_7$. It should be noted that signal $M_C$ does not come into existence when terminal $S_7$ is energized by way of AND gate $A_{17}$ in response to the pulse combination represented by the logical product $\bar{U}_4 U_2 \bar{U}_1$, P, i.e. upon a conversion of the unstable form $C_1$ to the stable form C.

The occurrence of output signal H on the last test pulse Z of FIG. 3 gives rise to a classification signal $M_F$ representing an interdigit pause or, in this particular instance, the end of dialing. This operation involves the energization of terminal $S_5$ via AND gate $A_{13}$ and OR gate $0_5$ in response to the pulse combinations represented by the last two terms of equation (2), i.e. the logical product $U_4 U_3 U_1 Z$ and $U_4 U_3 \bar{U}_2 Z$, pulses $U_1$ and $U_2$ being therefore applied through an OR gate $O_{16}$, FIG. 9, to one input of and AND gate $A_{35}$ whose other three inputs receive the pulses $U_3$, $U_4$ and Z to produce the signal $M_F$. This classification signal is not generated when the output signal H is engendered by a control pulse P coinciding with a signal R or $H_1$ in accordance with the first term of equation (2).

Graphs (*a*) and (*b*) of FIG. 4 show how, during the open-circuit phase $d_0$ of a dial pulse cycle, the busy-state permanence signal H degenerates to its unstable forms $H_1$ and $H_2$ in response to two consecutive control pulses Q, with temporary restoration of form $H_1$ by a lone pulse P due to a transient surpassing the threshold $I_s$, whereupon further pulses Q bring about the signals $H_2$ and B; a test pulse Z, occurring within that phase, causes a switchover to transition signal B′ which lasts until the following closed-circuit phase $d_1$ when a new pulse P creates the unstable signal $B_1'$. A negative transient (assuming positive line voltage) momentarily reestablishes the signal B′ but three further pulses P successively generate signals $B_1'$, $B_2'$ and C, the latter coinciding with the creation of a classification signal $M_C$ as previously described. The next interruption of the line loop, accompanied by another positive transient, leads to successive output signals $C_1$, C, $C_1$, $C_2$, B, with switchover to B′ in response to the second test pulse Z. As shown in graph (*b*), the omission of the closed-circuit phase $d_1$ after the interval $d_0$ maintains the signal B′ until the occurrence of a further test pulse Z which establishes the permanence signal R for the idle state. A following test pulse Z, on encountering this signal R, generates a classification signal $M_L$ indicating release of the line, the coincidence of pulses R and Z being expressed by the logical product $\bar{U}_4 \bar{U}_3 \bar{U}_2 \bar{U}1Z$; thus, we have shown in FIG. 9 an AND gate $A_{34}$ with five inputs receiving the pulses $\bar{U}_4$, $\bar{U}_3$, $\bar{U}_2$, $\bar{U}_1$ and Z, respectively, in order to produce the signal $M_L$. It will be apparent, however, that logic circuitry based upon the first three terms of equation (1) could be used to give rise to signal $M_L$ simultaneously with the generation of signal, R, i.e. upon the coincidence of a test pulse Z with a transition signal B′, $B_1'$ or $B_2'$ in a manner analogous to the development of signal $M_F$.

We claim:

1. In a telecommunication system having at least one channel switchable between two significant states of energization in relatively short pulsing cycles and relatively long switching intervals, the combination therewith of a source of sampling pulses with a recurrence period substantially shorter than any of said pulsing cycles; circuit means responsive to said sampling pulses for generating either of two types of control pulses signifying the instantaneous state of energization of said channel; a network with a first group of outputs assigned to one of said states of energization and a second group of outputs assigned to the other of said states of energization of said channel, the outputs of each of said groups including a first output for a starting signal occurring upon a changeover from the other group, a second output for a transition signal and a third output for a permanence signal, at least the first and the second output of each group including each a plurality of terminals for developing a stable form of the corresponding signal on one terminal and at least one unstable form thereof on another terminal, said network having inputs connected to receive said control pulses and said test pulses and further having circuitry for translating said two types of control pulses into output signals on said first and said second group of outputs, respectively, with switchover between different outputs of the same group in response to said test signals upon perseverance of the corresponding state of energization of said channel, said circuitry responding to coincidence of either form of starting signal with a test pulse for generating a corresponding form of transition signal and to coincidence of either form of transition signal with a test pulse for generating said permanence signal, said circuitry further responding to coincidence of said stable form on a terminal of one group with a control pulse of the type signifying the opposite state of energization for generating an unstable form on a terminal of the same group and to coincidence of an unstable form on a terminal of one group with a control pulse of the last-mentioned type for generating the stable form of a corresponding pulse on an output terminal of the other group; and an evaluating circuit connected to certain of said outputs for generating distinctive classification signals in response to output signals thereon.

2. The combination defined in claim 1 wherein said channel is a subscriber line provided with digital selector means for generating dialing pulses following one another within a digit with a cadence corresponding to said relatively short pulsing cycles, trains of said dialing pulses being separated by interdigit pauses corresponding to said relatively long switching intervals, said line having an open-circuit state of energization assigned to said first group of outputs and a closed-circuit state of energization assigned to said second group of outputs, said evaluating circuit including first gate means for generating a line release signal in response to the permanence signal of said first group, second gate means for generating an interdigit pause signal in response to the transition signal of said second group, and third gate means for generating a dialing pulse signal in the presence of an output signal of said first group and in response to a control pulse of a type giving rise to a starting signal of said second group.

3. The combination defined in claim 1 wherein said circuitry responds to coincidence of an unstable form of said starting signal with a test pulse for generating an unstable form of said transition signal on a terminal of the same group.

4. The combination defined in claim 3 wherein said channel is a subscriber line with alternate open-circuit and closed-circuit states of energization, said first group of outputs being assigned to said open-circuit state and including as its first output three terminals for a stable form B and two unstable forms $B_1$, $B_2$ of the starting signal, as its second output three terminals for a stable form B′ and two unstable forms $B_1'$, $B_2'$ of the transition signal, and as its third output a single terminal for the permanence signal R; said second group of outputs being assigned to said closed-circuit state and including as its first output three terminals for a stable form C and two unstable forms $C_1$, $C_2$ of the starting signal, as its second output three terminals for a stable form C′ and two unstable forms $C_1'$, $C_2'$ of the transition signal, and as its third output three terminals for a stable form H and two unstable forms $H_1$, $H_2$ of the permanence signal; said control pulses being of a first type Q assigned to said open-circuit state and of a second type P assigned to said closed-circuit state; said circuitry responding to coincidence of a control pulse P with the stable form B, B′ for respectively generating the first unstable form $B_1$, $B_1'$, to coincidence of a control pulse P with the second unstable form $B_2$, $B_2'$ for invariably generating the stable form C, to coincidence of a control pulse Q with the second unstable form $B_2$, $B_2'$ for generating the first unstable form $B_1$, $B_1'$, and to coincidence of a control pulse Q with the first unstable form $B_1$, $B_1'$ for respectively generating the stable form B, B′; said circuitry further responding to coincidence of a control pulse Q with the stable form C, C′, H for respectively generating the first unstable form $C_1$, $C_1'$, $H_1$ to coincidence of a control pulse Q with the first unstable form $C_1$, $C_1'$, $H_1$ for respectively generating the second unstable form $C_2$, $C_2'$, $H_2$, to coincidence of a control pulse Q with the second unstable form $C_2$, $C_2'$, $H_2$ for invariably generating the stable form B, to coincidence of a control pulse P with the second unstable form $C_2$, $C_2'$, $H_2$ for respectively generating the first unstable form $C_1$, $C_1'$, $H_1$, to coincidence of a control pulse P with the first unstable form $C_1$, $C_1'$, $H_1$ for respectively generating the stable form C, C′, H; said circuitry further responding to coincidence to a test pulse Z with any form of starting signal of either group to generate the corresponding form of transition signal within the group, to coincidence of a test pulse Z with any form of transition signal B′, $B_1'$, $B_2'$ of the first group to generate the permanence signal R thereof, and to coincidence of a test pulse Z with any form of transition signal C′, $C_1'$, $C_2'$ of the second group to generate the stable form H of the permanence signal H.

5. The combination defined in claim 4 wherein said network comprises a logic matrix with 16 output terminals for said output signals and coding means connected to said output terminals for translating said output signals into respective four-bit binary words, said logic matrix having eight input terminals connected to receive the original and inverted forms $U_1$, $U_2$, $U_3$, $U_4$ and $\bar{U}_1$, $\bar{U}_2$, $\bar{U}_3$, $\bar{U}_4$ of the bits of said binary words and three further input terminals connected to receive said control pulses P, Q and said test pulses Z.

6. The combination defined in claim 5 wherein said output terminals include a first terminal $S_0$ for the signal R, a second terminal $S_1$ for the signal B′, a third terminal $S_2$ for the signal $H_1$, a fourth terminal $S_3$ for the signal $B_1'$, a fifth terminal $S_4$ for the signal B, a sixth terminal $S_5$ for the signal H, a seventh terminal $S_6$ for the signal $C_1$, an eighth terminal $S_7$ for the signal C, a ninth terminal $S_8$ for the signal $B_2$, a 10 terminal $S_9$ for the signal $B_2'$, an 11 terminal $S_{10}$ for the signal $H_2$, a 12 terminal $S_{11}$ for the signal $B_1$, a 13 terminal $S_{12}$ for the signal C′, a 14 terminal $S_{13}$ for the signal $C_1'$, a 15 terminal $S_{14}$ for the signal $C_2$ and a 16 terminal $S_{15}$ for the signal $C_2'$, said coding means converting said output signals into the binary equivalents of the subscripts of the respective terminal designations.

7. The combination defined in claim 2 wherein said subscriber line is one of a plurality of such lines connected for consecutive scanning during successive cycles of predetermined length, said sampling pulses and said test pulses each having a duration equal to a scanning cycle and being concurrently applied to all said lines.